Patented Aug. 16, 1932

1,872,286

UNITED STATES PATENT OFFICE

HERMAN HECKEL AND WARREN T. REDDISH, OF CINCINNATI, OHIO, ASSIGNORS TO THE KONTOL COMPANY, OF DALLAS, TEXAS, A CORPORATION OF TEXAS

PROCESS OF AND REAGENT FOR TREATING PETROLEUM EMULSIONS

No Drawing.   Application filed June 19, 1928. Serial No. 286,709.

This invention relates to a process of separating petroleum and water, and is particularly directed to removing water from the petroleum and water emulsions which are encountered in the oil producing fields.

A large percent of the petroleum elevated at present contains enough water to render the same unacceptable to the pipe-line companies without dehydrating treatment. The U. S. Letters Patent to Francis M. Rogers, No. 1,299,385, issued April 1, 1919, discloses a method of separating water from the petroleum, the treating reagent disclosed by said patent being a water soluble salt of mineral oil sulphonic acid introduced into the emulsion preferably in a twenty-five percent aqueous solution.

While this reagent is the most effective reagent known for breaking emulsions, there are commercial problems connected with transporting and introducing it into the emulsion. One of these is that it is undesirable to ship a reagent in the form of a twenty-five percent solution, for the reason that it would be necessary to pay freight charges on a large quantity of water.

On the other hand, if the reagent is shipped in its natural state rather than in an aqueous solution there is a tendency for this material to jell and become hard to handle or to remove from kegs, drums or other containers.

Therefore, one object of this invention is to provide an emulsion breaking substance containing the Rogers reagent which can be easily shipped, handled, and incorporated into the emulsion.

Another object of this invention is to provide a reagent adapted to break a wide variety of emulsions so completely that the recovered oil is acceptable to the pipe-line compannies, said treating operation being attended by an amount and degree of heating which is minimum for the particular emulsion being treated.

The Rogers reagent, which is a water soluble mineral oil sulphonate, has been conventionally used in an aqueous solution for the reason that said reagent is readily soluble in water but difficult to dissolve in an oily body. We have discovered and ascertained, however, that if the Rogers reagent is dehydrated to a water content of preferably under ten percent, then said reagent becomes readily soluble in oils such as light hydrocarbons, peroleum fractions, kerosene, etc., and the solution of such a reagent or its admixture with kerosene, gasoline or the like, produces a homogeneous body which is sufficiently fluid at ordinary temperatures to be shipped in drums, containers, and the like, and that the reagent is sufficiently fluid to be readily incorporated into the emulsion so that it will distribute itself throughout and produce an action much more rapid than would be the case if it were relatively sticky, gummy or jell-like, in which case it would disperse itself throughout the emulsion more slowly.

We have also discovered and ascertained that the Rogers reagent is more effective in breaking the emulsion when introduced in solution with a light oil such as kerosene than in aqueous and/or alcoholic solution. By this is meant that a given percentage of components is effective in completely resolving a greater number of the infinite varieties of petroleum and water emulsions, and that said resolution takes place relatively more rapidly and with lesser expenditure of heat, both of which results are highly desirable from the commercial standpoint.

Moreover, it has been found desirable in dissolving many petroleum and water emulsions to use in addition to the Rogers reagent a component of relatively high molecular weight which is readily soluble in the petroleum of the emulsion, in order that this component may affect the surface tension of the oil phase and change the balance of the components of the emulsion relatively to expedite or accelerate the coalescence of the petroleum and water.

Among the substances adapted to perform this function are the oil layer mineral oil sulphonates obtained from the practice of the Petroff-Humphreys refining process described in Patents Nos. 1,233,700, dated July 17, 1917, and 1,286,179, dated November 26, 1918, and also bituminous pitch, a suitable pitch being one which has a melting point between 35° C. and 95° C. as tested by the ball and ring method of The American Society for Testing Material specifications.

Both of these specified substances, and substances of this general class as well, are admirably adapted to accelerate the coalescence of the components of a petroleum and water emulsion when used in combination with the Rogers reagent, and particularly when used in combination with a hydrocarbon or oily carrier and fluidity producer such as kerosene.

One example of a reagent of this type is constituted by combining between twenty and ninety percent Rogers reagent dehydrated to below 10% water content and pitch up to eighty percent or oil layer mineral oil sulphonate up to sixty-eight percent with twenty-five percent of their weight of kerosene. This reagent is incorporated in the emulsion in the proportion of approximately one part reagent to one thousand parts emulsion, and if necessary, the emulsion is heated to a temperature approximating 100° F. and upwards, at which temperature the emulsion is permitted to remain for some hours, depending upon the so-called stubbornness of the emulsion, after which the components are stratified by settling, filtering, centrifugal machinery or other well-known means.

It is to be further noted that in addition to the alkali or water soluble salts of the mineral oil sulphonic acids, the acids themselves may be employed in this specific combination of components either alone or in combination with sodium or other salts of mineral oil sulphonic acid. By this is meant that one can select and use a mineral oil sludge layer sulphonic acid in combination with an oil layer mineral oil sulphonic acid or salt thereof, such as the sodium or aluminum salt. On the other hand, one can select and use a sludge layer mineral oil sodium sulphonate in combination with an oil layer mineral oil sulphonic acid or sodium or aluminum salt. It is also possible to use a sludge layer mineral oil aluminum sulphonate in combination with an oil layer mineral oil sodium sulphonate, since these components form a rather ubiquitously soluble reagent. The sulphonic acid seems to have but little corrosive action upon metallic containers in the presence of the petrolic or coal tar distillates.

If desirable, in any case the pitch can be substituted for the oil layer material or used in combination with the oil layer material. The presence of high percentages of pitch is often advantageous in that they prevent the stabilization of the emulsion or the partial breaking thereof which might be induced by the presence of a percentage of sulphonates too high in relation to the emulsion being treated. The percentages of the components may also be varied over relatively wide ranges without interfering with the homogeneous qualities of the reagent. This is highly desirable since emulsions vary not only in the different fields, but with the location of the well in reference to the center or rim of the pool, the age of the well, the salt content of the water of the emulsion, and the presence of emulsifying compounds.

It is, therefore, often necessary to change slightly the percentage of components in a given reagent being used upon a particular emulsion responsively to change the characteristics of the emulsion, and the latitude permitted by the characteristics of the above described combination makes it possible to use one combination of ingredients for an extremely wide range of emulsions.

Having described our invention, we desire to be limited only by the ensuing claims:

1. The process of breaking petroleum and water emulsions, said process comprising mixing in said emulsions a reagent comprising dehydrated sludge layer mineral oil sulphonic bodies mixed with fluid hydrocarbon oil, heating said emulsion to produce a break, and stratifying the oil and water components thereof.

2. A reagent adapted to resolve emulsions of petroleum and water, said reagent, comprising, water soluble sludge layer mineral oil sulphonic bodies, oil layer mineral oil sulphonic bodies, and a light mineral oil fraction of the type of kerosene combined into a homogeneous fluid.

In witness whereof, we hereunto subscribe our names.

HERMAN HECKEL.
WARREN T. REDDISH.